United States Patent [19]

VanSickle

[11] Patent Number: 4,663,979

[45] Date of Patent: May 12, 1987

[54] SOLENOID ATTACHMENT FOR ELECTRIC STARTING APPARATUS

[75] Inventor: Richard A. VanSickle, Anderson, Ind.

[73] Assignee: General Motors Corporation, Detroit, Mich.

[21] Appl. No.: 820,663

[22] Filed: Jan. 21, 1986

[51] Int. Cl.⁴ ...................... F02N 15/06; B21D 39/00; B23P 11/00

[52] U.S. Cl. ...................................... 74/7 A; 29/510; 29/516; 403/274; 403/279

[58] Field of Search .............. 74/6, 7 R, 7 A; 29/510, 29/516, 517, 283.5; 72/67; 285/382; 290/38 A, 38 C, 48; 335/131; 403/274, 279

[56] References Cited

U.S. PATENT DOCUMENTS

| | | | |
|---|---|---|---|
| 1,223,591 | 4/1917 | Layne | 29/517 |
| 1,693,839 | 12/1928 | Faudi | 29/517 X |
| 2,487,512 | 11/1949 | Berger | 29/516 X |
| 2,739,726 | 3/1956 | Bregen | 218/38 |
| 2,839,935 | 6/1958 | Hartzell et al. | 74/6 |
| 3,020,771 | 2/1962 | Redick et al. | 74/7 |
| 3,055,100 | 9/1962 | Kimpel | 285/382 X |
| 4,540,962 | 9/1985 | Gresley et al. | 335/131 |
| 4,579,010 | 4/1986 | Colvin et al. | 74/7 A |

FOREIGN PATENT DOCUMENTS

| | | | |
|---|---|---|---|
| 2266030 | 10/1975 | France | 403/274 |
| 786938 | 11/1957 | United Kingdom | 74/7 A |

*Primary Examiner*—Allan D. Herrmann
*Attorney, Agent, or Firm*—C. R. Meland

[57] ABSTRACT

A fastening arrangement for securing the solenoid of an electric engine starter to an aluminum starter housing. The solenoid has a steel casing formed with a plurality of outer circumferentially spaced radially extending cylindrical bores. The portion of the casing that has the bores is located within a tubular portion of the aluminum starter housing. Portions of the material of the housing, that overlie the bores, is flowed into the bores by a tool that is moved in a generally conical path and which is capable of rotating about its own longitudinal axis. The material that is flowed into the bores secures the solenoid to the starter housing.

6 Claims, 4 Drawing Figures

SOLENOID ATTACHMENT FOR ELECTRIC STARTING APPARATUS

This invention relates to attaching or securing the solenoid of an electric cranking motor or starter to the housing of the cranking motor and to a method or process of making the attachment of the solenoid to the housing of the cranking motor.

Electric starters that utilize a solenoid to shift a pinion into and out of mesh with the ring gear of an engine to be cranked are well known to those skilled in the art. One type of such a starter is disclosed in the Hartzell et al. U.S. Pat. No. 2,839,935. In that patent the starter solenoid is attached to a housing by bolts which pass through holes formed in an end flange of the solenoid housing.

Another mounting arrangement for attaching or securing a solenoid to an electric starter is disclosed in the Redick et al. U.S. Pat. No. 3,020,771. In that patent one end of the solenoid is disposed within a tubular portion of a shift lever housing. The solenoid is secured to the motor frame by a bracket that is bolted to the motor frame.

In contrast to the solenoid attachment arrangements described in the above-referenced patents it is an object of this invention to provide an arrangement for attaching a solenoid to a housing of an electric starting motor that completely eliminates the need for fasteners such as bolts or screws for securing the solenoid to the starting motor. The present invention secures or attaches the solenoid to the starting motor by spin riveting portions of the housing of the starting motor into bores or holes formed in the casing of the solenoid. In practicing the method of this invention, the outer steel case or housing of the solenoid is machined to provide a plurality of circumferentially spaced holes or bores. The part of the solenoid that has the bores is then inserted into a tubular portion of a starter motor housing that is formed of die cast aluminum. Following this, circumferentially spaced areas of the aluminum starter motor housing, that overlie the bores or holes in the solenoid casing, are moved or flowed into the bores by spin riveting the aluminum material of the motor housing into the bores of the solenoid case. When the material of the starter motor housing has been moved into the solenoid casing bores the solenoid is securely fastened to the motor housing and this is accomplished without the use of fasteners, such as bolts or screws.

Another object of this invention is to provide an improved electric starter wherein the solenoid is fastened to the housing of the starting motor by material of the housing of the starting motor that has been moved into bores or holes formed in a solenoid casing or housing.

IN THE DRAWINGS

Figure 1:
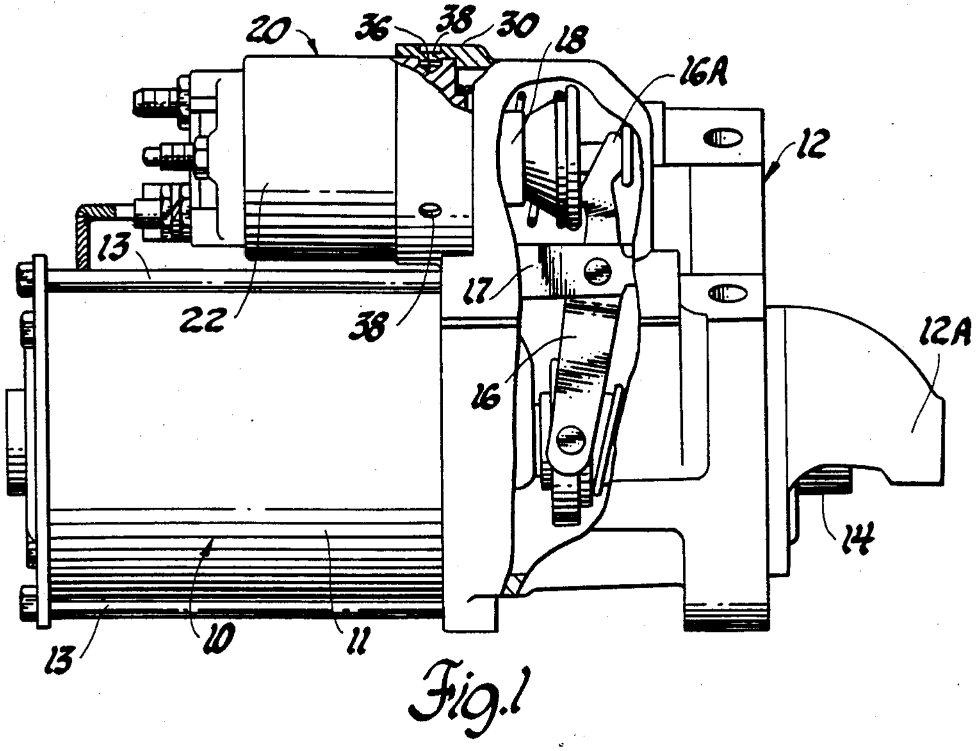
FIG. 1 is a side view of an electric starter or cranking motor, with parts broken away and partly in section, which utilizes the connecting method of this invention to attach the solenoid to a starter housing.

Referring now to the drawings, and more particularly to FIG. 1, an electric starter or cranking motor is illustrated. This starter has a direct voltage motor 10 that has a steel housing 11. The housing 11 is secured to a housing 12 which is formed of die cast aluminum. This is accomplished by bolts 13 which are threaded into suitable threaded holes formed in housing 12. The direct current motor 10 has an armature located within housing 11 which drives a shaft. The shaft carries a pinion 14 which is shifted into and out of mesh with a ring gear of an engine to be cranked. The shaft is supported for rotation by a bearing carried by nose portion 12A of housing 12.

The pinion 14 is shifted by a shift mechanism that includes a pivotally mounted shift lever 16. The lever 16 is pivotally supported by a part 17, the left 30 end of which engages a rubber part 19, shown in FIG. 4. One end 16A of shift lever 16 is coupled to the plunger 18 of a solenoid that is generally designated by reference numeral 20. The shift lever mechanism is preferably of the type that is disclosed in U.S. patent application Ser. No. 654,138, filed on Sept. 26, 1984, which is now U.S. Pat. No. 4,579,010 and assigned to the assignee of this invention.

The solenoid 20 is comprised of a steel case 22 that has a cylindrical tubular portion 22A and an annular end wall 22B. The end wall 22B has a central hole which accommodates reciprocal movement of plunger 18 relative to solenoid case 22. The solenoid 20 has a stainless steel tube 24 which supports plunger 18 in its reciprocal movement. The solenoid has pull-in and hold-in coils which have been collectively identified by reference numeral 26. These coils are, supported by a coil winding support or spool designated by reference numeral 28 which is formed of insulating material. The solenoid 20 is disclosed in detail in the Gresley et al. U.S. Pat. No. 4,540,962 granted on Sept. 10, 1985.

The aluminum housing 12 has a semicircular tubular portion 30 which receives one end of the solenoid case 22. The portion 30 has an annular internal surface 32 which engages an outer surface of the end portion of case 22. The portion 30 further has an annular surface 34 which engages an annular end surface of case 22 when the end of case 22 is fully inserted into portion 30 of housing 12.

The case 22 has three radially extending bores, each designated by reference numeral 36. These bores are 120° apart and are located closely adjacent the end wall 22B of case 22. The bores 36 are formed by drilling the case 22 and each bore 36 is comprised of a conical inner surface 36A and a cylindrical inner surface 36B. The solenoid case 22 is secured to the aluminum housing 12 by flowing or moving circular areas of the housing portion 30 into the bores 36 of case 22. The material of aluminum housing 12 that has been forced, moved or flowed into bores 36 has been designated by reference numeral 38.

Figure 3:
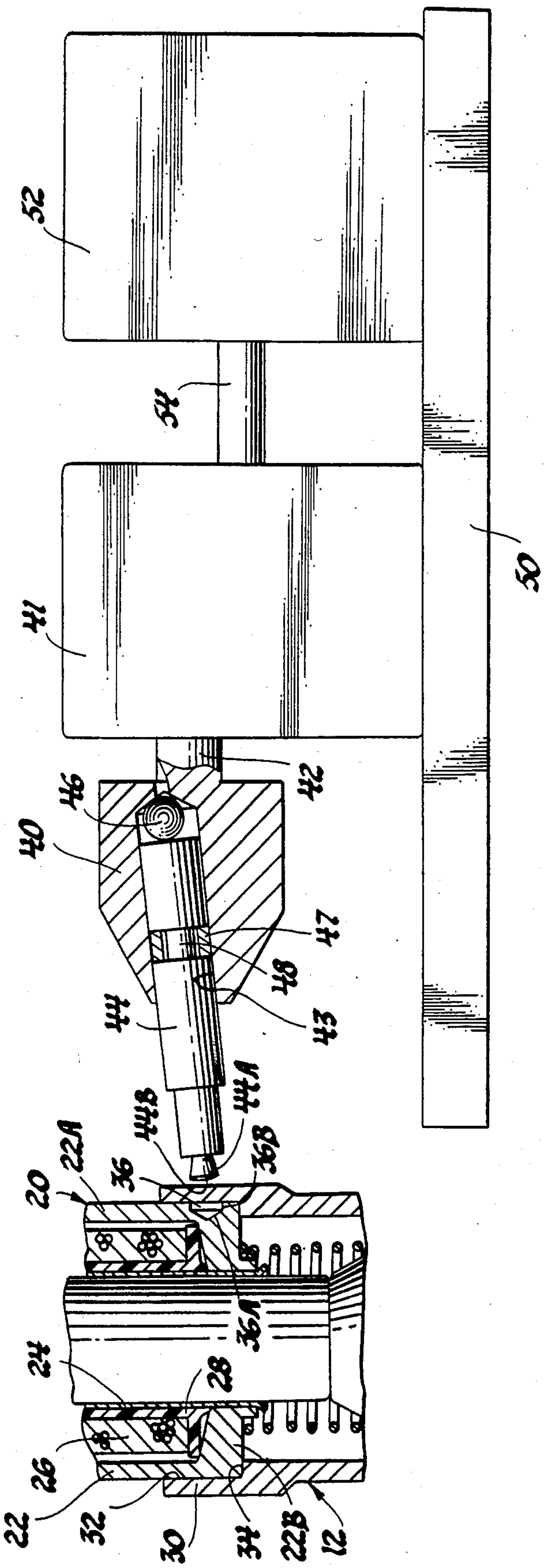
FIG. 3 illustrates apparatus for moving a portion of the starter housing into a bore formed in the solenoid case.

The apparatus for spin-riveting material of the aluminum housing portion 30 into the bores 36 of solenoid case 22 is illustrated in FIG. 3. This apparatus comprises a rotatable tool support 40 having a shank 42 that is adapted to be received in a coupling chuck (not illustrated) that is rotatably driven by an electric motor 41.

The tool support 40 has an inclined bore 43. A spinning tool 44 is freely rotatable in bore 43 and has a circular tip 44A which has a slight conically shaped end face 44B. The ball 46 forms a thrust bearing for spinning tool 44 and tool 44 is retained in bore 43 by a spring ring 47 that fits in a groove 48 formed in spinning tool 44. The tool that has just been described is disclosed in the Bregen U.S. Pat. No. 2,739,726.

The electric motor 41 that rotatably drives tool support 40 is slidably supported by a fixture or support 50 in any conventional fashion. The motor 41 is shifted toward or away from starter housing portion 30 by a pneumatic power cylinder 52 that is fixed to support 50 and which has a piston rod 54 connected to the housing of motor 41. The tool support 40 and tool 44 carried thereby can therefore be moved in a manner, to be described, relative to support 50 by actuation of the pneumatic power cylinder 52.

When it is desired to attach the solenoid 20 to the portion 30 of starter housing 12 the starter housing is suitably supported such that it is vertically oriented, as depicted in FIG. 3. Thus, the longitudinal axis of portion 30 is vertically disposed. At this stage of assembly of the starter the motor 10 has not been attached to housing 12 and accordingly only the housing 12 is vertically supported when the solenoid 20 is secured to housing 12.

With the housing 12 vertically supported, as illustrated in FIG. 3, one end of solenoid 20 is inserted into portion 30 of housing 12 such that an annular outer surface of solenoid casing end wall 22B bottoms out against surface 34 of housing 12. The outer diameter of solenoid case 22 and the internal diameter of housing surface 32 are such that the solenoid case 22 has a press-fit with the internal surface 32 so that when one end of the solenoid case is inserted into portion 30 of housing 12 it is press-fitted thereto.

Figure 4:
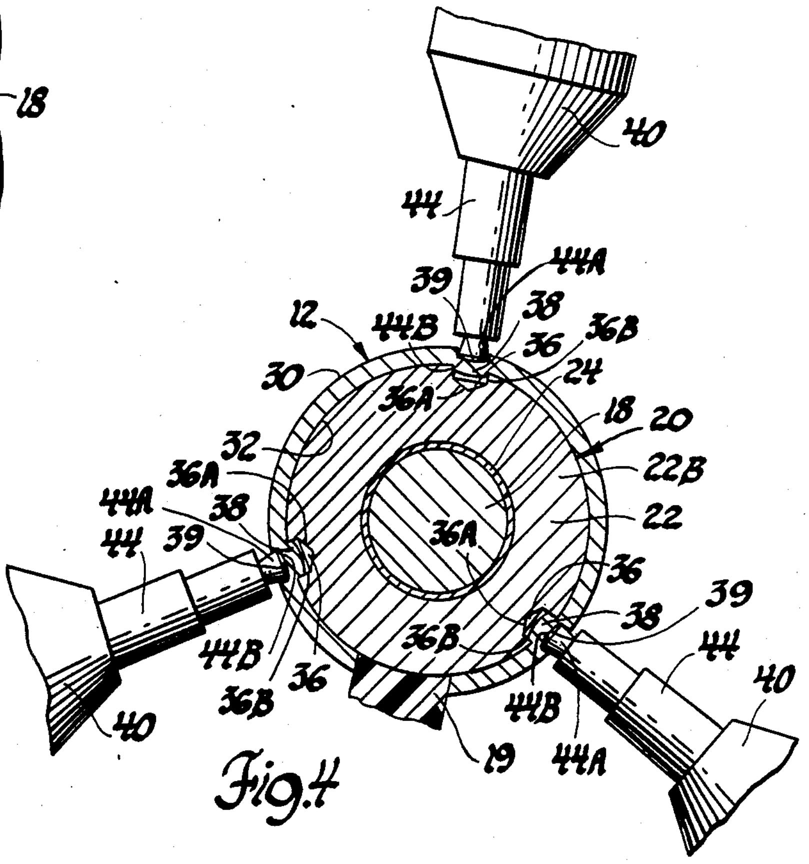
FIG. 4 illustrates apparatus for simultaneously moving three portions of a starter housing into three bores formed in the solenoid case where the starter housing and solenoid are illustrated in a sectional view taken along line 4—4 of FIG. 2.

With the end of solenoid casing 22 inserted into portion 30 of housing 12, three circular portions 38 of housing 12 are now flowed or moved into holes or bores 36. FIG. 3 illustrates apparatus for moving or flowing one portion of housing 12 into one bore 36. It is preferred that three portions 38 of housing 12 be moved simultaneously into three bores 36 in a manner depicted in FIG. 4. Thus, three spinning tools 44 are illustrated in FIG. 4 in a position where portions 38 have been moved into bores 36. In regard to FIG. 4, it is to be understood that three motors, three pneumatic cylinders and three tool supports, like support 40, are utilized and all supported by a common support like support 50 illustrated in FIG. 3.

Figure 2:
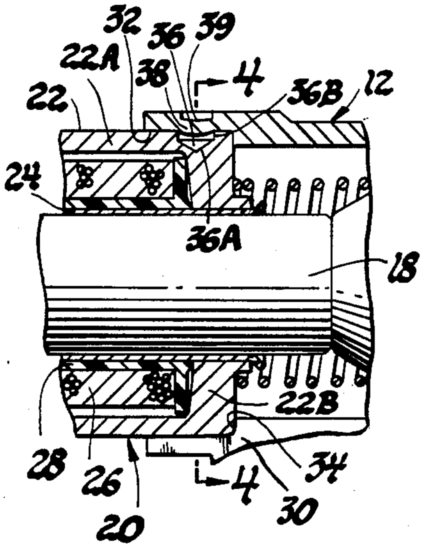
FIG. 2 is an enlarged sectional view of a portion of FIG. 1 which illustrates a portion of the starter housing moved or flowed into a bore formed in the case of the solenoid.

In the further description of this invention only one spinning tool operation will be described in connection with FIG. 3, it being understood that other two spinning tools operate in the same manner. Referring now to FIG. 3, when it is desired to move or flow material of the aluminum housing into a bore 36 the tool support 40 is rotated by electric motor 41. The motor is moved axially by pneumatic cylinder 52 to cause face 44B of spring tool 44 to engage the outer surface of housing portion 30 at a point that is aligned with the longitudinal axis of the bore 36. As tool support 40 rotates the tool 44 will be moved in a generally conical path. In this regard, it is pointed out that the longitudinal axis of tool 44 is inclined to the longitudinal axis of bore or hole 36 by an angle of inclination that may be about 3 or 6 degrees. When the face 44B of tool 44 engages housing portion 30 the frictional engagement between the tool face 44B and housing portion 30 will cause the tool 44 to rotate around its own longitudinal axis relative to tool support 40. The tool 44 accordingly is now being moved in a conical path and is also rotating about its own axis. As a result of this the face 44B will cause the material of housing portion 30 that is engaged by face 44B to be rolled or ironed and as tool 44 is progressively moved toward housing portion 30 the aluminum material of housing portion 30 is ironed, rolled or flowed into bore 36. The material that has been flowed into bore 36 is designated as 38 and this material has a cylindrical shape conforming to the cylindrical bore surface 36B. The outer cylindrical surface of portion 38 engages the cylindrical surface 36B of bore or hole 36. The flowed or moved portions 38 do not entirely fill the bore 36, that is, material is not moved or flowed into an area defined by conical surface 36A. In this regard, FIG. 4 illustrates the position of the tool faces 44B when they have moved inwardly to their final inward position (finished stroke). The total amount of radial penetration of the tool face 44B into housing portion 30 is such that outer wall portions 39 that are engaged by tool faces 44B are moved radially inwardly by about 0.047 inches. The flowed or moved portions 38 may be termed cylindrical slugs of housing material. When portions 38 have been moved into bores 36 to the required depth, as shown in FIGS. 2 and 4, the tools 44 are retracted by actuation of power cylinders 52 to a position away from housing portion 30. The solenoid 20 has now been securely attached to the starter housing 12 and motor 10 can now be secured to housing 12 by bolts 13 to complete the assembly of the starter illustrated in FIG. 1.

The tool support 40 and the manner in which tool 44 is carried thereby may take forms other than the one illustrated in FIG. 3 as long as the apparatus that is utilized moves the tool in a conical path and allows the tool to rotate about its own longitudinal axis. This type of apparatus can be termed as orbital spin-riveting apparatus.

By way of example, and not by way of limitation, the diameter of the cylindrical bore wall or surface 36B may be about 6.30 to 6.55 mm and its radial depth about 1 to 1.25 mm.

In summary, it will be appreciated that the attaching method of this invention completely eliminates the need for fasteners, such as bolts or screws, for securing a solenoid to the housing of a starter. Further, this has been accomplished by method that does not apply large impact forces to the aluminum starter housing that might fracture the housing.

The embodiments of the invention in which an exclusive property or privilege is claimed are defined as follows:

1. A solenoid to starter housing fastening arrangement comprising, a starter housing formed of aluminum material having a tubular portion that has an annular internal wall, a solenoid having a metallic case one end of which is located within said tubular portion with an end surface of said metallic case engaging said annular internal wall, a plurality of circumferentially spaced radially extending cylindrical bores formed in the portion of said case that is located in said tubular portion of said starter housing, and a cylindrical slug of aluminum housing material integral with said housing in each of said bores, each slug of material engaging an internal cylindrical surface defining a respective bore for fastening said solenoid to said starter housing.

2. A solenoid to starter housing fastening arrangement comprising, a starter housing formed of aluminum material having a tubular portion that has first and second internal annular walls, a solenoid having a metallic case one end of which is located within said tubular portion with an end surface of said metallic case engaging said first annular wall, said case having an outer annular surface portion engaging said second annular wall, a plurality of circumferentially spaced radially extending cylindrical bores formed in said outer annular surface portion of said case, and a cylindrical slug of aluminum housing material integral with said housing in each of said bores, each slug of material extending radially inwardly from said second annular wall and engaging an internal cylindrical surface defining a respective bore for fastening said solenoid to said starter housing.

3. The fastening arrangement according to claim 2 where the outer annular surface portion of the solenoid case has a press-fit with the second internal annular wall of the starter housing.

4. A method of securing a solenoid that has a metallic case to an aluminum housing of an electric starter, the steps comprising, forming a bore in an outer wall of said solenoid case, inserting the portion of the solenoid case that has said bore into a tubular portion of said aluminum housing such that a portion of the aluminum housing overlies the bore in said solenoid case, and then moving material of said aluminum housing into said bore of said solenoid case by engaging said aluminum housing with a tool that applies pressure to said aluminum housing, the longitudinal axis of the tool being inclined to the longitudinal axis of said bore and said tool being moved in a generally conical path and being supported for rotation about its own longitudinal axis.

5. A method of securing a solenoid that has a metallic case to an aluminum housing of an electric starter, the steps comprising forming a radially extending cylindrical bore in an outer wall of said solenoid case, inserting the portion of the solenoid case that has said bore into a tubular portion of said aluminum housing such that a portion of the aluminum housing overlies the bore in said solenoid case, and then moving material of said aluminum housing into said cylindrical bore of said solenoid case and into engagement with an internal cylindrical wall of said bore by engaging said aluminum housing with a tool that applies pressure to said aluminum housing, the longitudinal axis of said tool being inclined to the longitudinal axis of said bore and said tool being moved in a generally conical path and being supported for rotation about its own longitudinal axis.

6. A method of securing a solenoid that has a metallic case to an aluminum housing of an electric starter, the steps comprising, forming a radially extending cylindrical bore in an outer wall of said solenoid case, inserting the portion of the solenoid case that has the bore into a tubular portion of said aluminum housing such that a portion of the aluminum housing overlies the bore in said solenoid case, the outer wall of said case having a press-fit with an internal surface of said tubular portion and having an end surface that engages a surface of said tubular portion when said solenoid case is fully inserted into said tubular portion, and then moving material of said aluminum housing into said cylindrical bore of said solenoid case and into engagement with an internal cylindrical wall of said bore by engaging said aluminum housing with a tool that applies pressure to said aluminum housing, the longitudinal axis of said tool being inclined to the longitudinal axis of said bore and said tool being moved in a generally conical path and being supported for rotation about its own longitudinal axis.

* * * * *